WILLIAM J. PATTERSON
&
JOSEPH WEISSENSTEIN
*INVENTORS*

BY *R. L. Story*

ATTORNEY

Nov. 30, 1954  W. J. PATTERSON ET AL  2,695,418
GIZZARD SPLITTING AND CLEANING MACHINE

Filed Dec. 3, 1952  5 Sheets-Sheet 2

WILLIAM J. PATTERSON
&
JOSEPH WEISSENSTEIN
INVENTORS

BY R. L. Story

ATTORNEY

Nov. 30, 1954  W. J. PATTERSON ET AL  2,695,418
GIZZARD SPLITTING AND CLEANING MACHINE
Filed Dec. 3, 1952  5 Sheets-Sheet 3

WILLIAM J. PATTERSON
&
JOSEPH WEISSENSTEIN
*INVENTORS*

BY R. L. Story
ATTORNEY

Nov. 30, 1954   W. J. PATTERSON ET AL   2,695,418
GIZZARD SPLITTING AND CLEANING MACHINE
Filed Dec. 3, 1952   5 Sheets-Sheet 4

WILLIAM J. PATTERSON
&
JOSEPH WEISSENSTEIN
*INVENTORS*

BY *R. L. Story*

ATTORNEY

WILLIAM J. PATTERSON
&
JOSEPH WEISSENSTEIN
*INVENTORS*

United States Patent Office 2,695,418
Patented Nov. 30, 1954

2,695,418

GIZZARD SPLITTING AND CLEANING MACHINE

William J. Patterson, La Grange, and Joseph Weissenstein, Chicago, Ill., assignors to Swift & Company, Chicago, Ill., a corporation of Illinois Application December 3, 1952, Serial No. 323,804

17 Claims. (Cl. 17—11)

The present invention relates to an apparatus for opening and cleaning animal organs.

Traditionally the method of opening and cleaning animal organs such as poultry gizzards has been a hand operation. However, with the increasing volume of poultry being dressed for sale to the public, there has been a pressure to minimize the amount of hand labor required so as to enable the poultry to be sold at the lowest possible price. Recently there have been several proposals for machines to perform this operation of opening and cleaning poultry gizzards, but in some respects these machines have not been entirely satisfactory. The principal object of the present invention is to provide an apparatus that will substantially eliminate these difficulties that have been encountered, while, at the same time reducing the costs involved in this operation.

An object that is a corollary of the foregoing is to provide a machine that will perform satisfactorily with the regular run of gizzards as they are received from the birds being eviscerated. The gizzards in such a run vary substantially in size and shape, which fact has caused considerable difficulty in the past because such non-uniformity has resulted in many of the gizzards either being cut too much or cut too little, plus the further result of a substantial quantity of the gizzards being unsatisfactorily cleaned. For all practical purposes the present invention overcomes this difficulty and the variance in the size of the gizzards does not result in a variance in the results achieved by the machine.

Another factor that has produced considerable trouble in such a machine is the presence of stones and other foreign material within the interior of the gizzard. The knife blades used to cut the gizzards have been quickly dulled by striking such material, with the result that the knives soon begin to fail to cut properly. The necessity for continually sharpening such knives, or replacing them, has been most unsatisfactory. Following the practices of the present invention the life of the knives, as judged by the number of gizzards than can be handled before resharpening or replacement is required, is greatly extended.

An additional advantage of the present invention is that the gizzards are so cut and cleaned that there is no opportunity for "contamination" of the gizzards. "Contamination," at least by one standard, is judged by whether or not during processing the contents of such organs as the gizzard come into contact with portions of the organ not normally contacted by said contents. This is judged to be so whether or not those portions are subsequently cleaned. In the present invention the cutting and washing are so handled that there is not the opportunity for such "contamination."

Other objects and advantages include: a device that is relatively simple and in which a substantial number of the parts are readily available in the market whereby the initial cost is quite reasonable; a device that because of its simplicity, positioning of parts and the like, is easily maintained and requires no special skills for such maintenance; and a device that has substantially no critical adjustments to get out of position, whereby day after day it can be expected to operate in a satisfactory manner.

Further objects and advantages will become apparent from the following description taken in conjunction with the drawings which will be described in connection with the splitting and washing of gizzards. It should be understood, however, that other internal animal organs such as hearts, livers, etc., can be split and cleaned as well as by the apparatus of the present invention.

Figure 1:
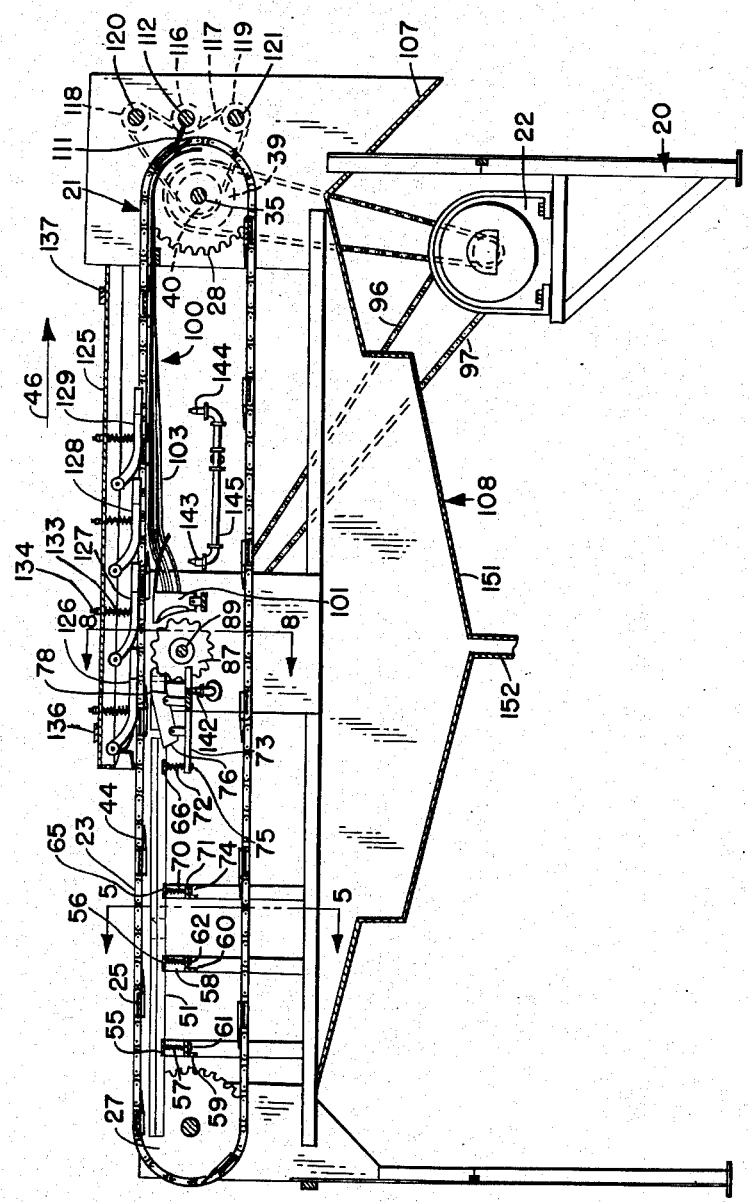
Figure 1 is a sectional elevation of an embodiment of the machine.

The method of the present invention has been devised particularly to clean the gizzards while at the same time avoid the severe dulling of the cutting instruments caused by the contents of the gizzard contacting the edges of the cutting instruments. To facilitate the cleaning of the gizzard and the removing of the gizzard lining, the gizzard is normally cut from one side of the gizzard across to the inner edge of the opposite side of the gizzard.

Preferably the gizzard is first impaled with the pale being inserted through the gizzard immediately adjacent the inner wall at one side of the gizzard. The gizzard is then cut from the opposite wall of the gizzard part way through to the pale. A strong stream of water is directed into the opening produced by this partial cut to dislodge a substantial portion of the contents of the gizzard. Preferably this spraying takes place with the gizzard positioned so that the cut is down to facilitate the dislodging of the contents from the gizzard. A second cut is then made from the first cut across to the points of impalement. While it is possible to eliminate the intermediate spray, its use facilitates the removal of at least some of the contents of the gizzard to lessen the dulling of the second knife.

The advantage of this method is that the first cut is not sufficiently deep to cause severe dulling of the edge of the cutting instrument by contact with the contents of the gizzard, while the second cut is made after a substantial portion of the contents of the gizzard have been removed so as to reduce or eliminate the dulling of the cutting edge of the implement used in making the second cut. It will be apparent that the same method could be performed by making more than two cuts, with each one being increasingly deeper, but two have found to be quite satisfactory.

In the disclosed embodiment, the first cut is made by a single fixed blade across which the gizzard is drawn. The depth of the cut is to within about one-quarter inch of the points of impalement. The flushing is performed at the time of the making of this cut, or immediately thereafter. The second cut in the disclosed embodiment is made by means of a rotary knife having a sharpened serrated edge.

After the cuts have been completed, the two walls of the gizzard that have been separated by this cutting are spread away from each other and the gizzard is further washed with suitable water jets.

In the illustrated embodiment, a frame, generally 20, carries a conveyor, generally 21. The conveyor, as well as the rotary knife hereinafter described, is driven from a suitable power means such as motor 22.

Conveyor 21 comprises a pair of chains 23 and 24, connected by a plurality of spacers 25. Chain 23 moves around sprockets 27 and 28, while chain 24 travels over a similar pair of sprockets 29 and 30. Sprockets 27 and 29 are secured to a shaft 32 suitably journaled in a pair of anti-friction bearings 33 and 34, secured to frame 20. Similarly, sprockets 28 and 30 are attached to a shaft 35, mounted in bearings 36 and 37 on frame 20.

Shaft 35 also has secured to it two other sprockets, 39 and 40 respectively. A chain 41 connects sprocket 39 with a sprocket 42 on the shaft 43 of motor 22.

Figure 3:
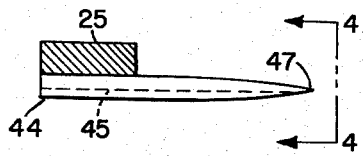
Figure 3 is an elevational view of one of the pales used for mounting the gizzards, and the supporting member for that pale.
Figure 4:
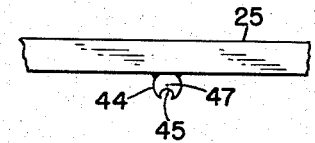
Figure 4 is an end view of the pale and supporting member illustrated in Figure 3 looking from line 4—4.

Conveyor 21 is provided with a plurality of transporting means for the gizzards to be cut and washed on the machine. In the disclosed embodiment the transporting means take the form of a plurality of pales 44 secured to spacer bars 25. The preferable form of the pales is illustrated in Figures 3 and 4. The side opposite the spacer bar 25 is formed with a groove 45. With respect to the direction of movement of the top run of the conveyor, which is illustrated by arrow 46, the pales 44 extend forwardly from the spacer bars 25 with the forward nose 47 of the pale 44 tapering to a point, to facilitate slipping the gizzards 48 on the pales.

Along the beginning of the upper run of the conveyor are two pair of trough-like loading and aligning guides. The first pair of guides are formed of a pair of metal strips 50 and 51, respectively. The inner edge of each strip is bent inwardly and downwardly to form inner faces 52 and 53, respectively. Each of strips 50 and 51 are attached to spacers 55 and 56, which spacers in turn are supported on the ends of springs 57 and 58, respectively. The lower ends of springs 57 and 58 bear against angle irons 59 and 60, forming a part of frame 20. Bolts 61 and 62 within springs 57 and 58 are connected to the spacers and pass loosely through the angle irons to hold the guide in place while allowing it to be depressed.

The second alignment guide is formed of strips 63 and 64 secured to spacers 65 and 66. The inner faces 68 and 69 of strips 63 and 64, respectively, are similarly turned inwardly and down to form the trough-like structure. A spring 70 bears against spacer block 65 and also on an angle iron 71 forming a part of frame 20. Similarly a second spring 72 is positioned between spacer 66 and an arm 73 secured to frame 20. Bolts 74 and 75 are attached to spacers 65 and 66 respectively, and fit loosely through openings in angle iron 71 and arm 72.

Figure 5:
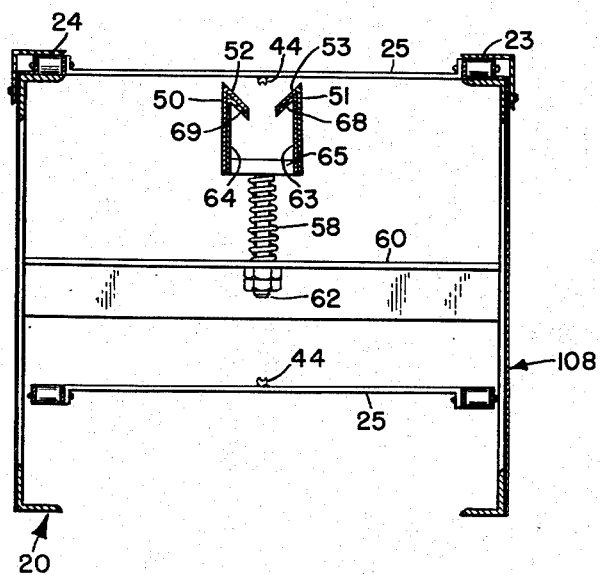
Figure 5 is an enlarged partial section taken at line 5—5 of Figure 1.
Figure 6:
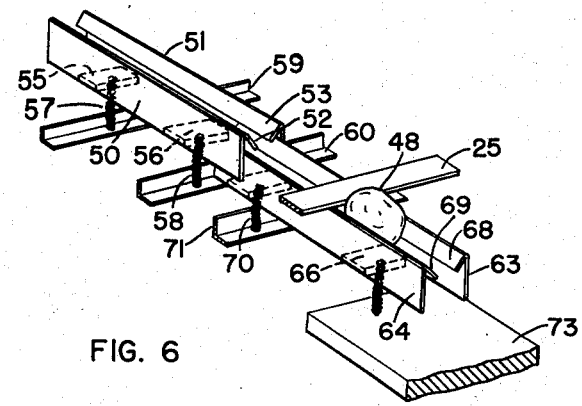
Figure 6 is an isometric view of a portion of the machine illustrating particularly the alignment guides which are an aid in placing the gizzards in the machine and facilitate the handling of gizzards of various sizes.

As is shown, particularly in Figures 5 and 6, the first pair of guides 50 and 51 is above, i. e. closer to the pales on the run of the conveyor on which the processing of the gizzards takes place, and partially overlaps the second pair of guides, 63 and 64. The differently positioned guides are to facilitate the loading of different sizes of gizzards and also prevent a large gizzard from so displacing the guide that a small gizzard is not properly positioned and supported.

Beyond, with respect to the direction of movement of the pales 44, and aligned with the path of travel of the gizzards 48, is a fixed knife 76 having a sharpened edge 77. The knife 76 is attached to frame 20 with the sharpened edge projecting upwardly into said path of travel of the gizzards. The knife edge 77 is positioned sloping upwardly or towards the pale 44 in the direction of movement 46 of the pales, with the rear corner 78 of the knife being approximately one-quarter inch below the pales as they pass thereover.

A pair of guide plates 80 and 81 are mounted to either side of knife 76. Guide plates 80 and 81 are pivotally supported on pins 82 and 83 respectively, secured to, and extending upwardly from, frame 20. Springs 84 and 85 are attached to guides 80 and 81, respectively, and also are attached to frame 20 to urge the guide plates towards knife 76. It has been found that this mounting of the guides insures that the cut into the gizzard is started in the middle of the bottom wall of the gizzard. With the cut started properly it serves as a guide for increasing its depth.

The second of the two knives in the disclosed embodiment is a rotary knife 87 having a sharpened serrated edge 88. Knife 87 is secured to a shaft 89 to which also is affixed a sprocket 90. Shaft 89 is journaled in bearings 91 and 92 attached to frame 20. A sprocket 94 (Figures 2 and 8) is journaled on a stub shaft 95, projecting outwardly from frame 20. Sprocket 94 is aligned with sprocket 90, but mounted beyond and above sprocket 90. The reason for using sprocket 94 is to obtain a reversal of rotation of shaft 89 with respect to the direction of rotation of shaft 43 of motor 22.

In Figure 1 it will be seen that motor 22 rotates in a clockwise direction to give the conveyor 21 the direction of movement shown by arrow 46. However, it is desired to have shaft 89 and blade 87 rotate in a counterclockwise direction as seen in Figure 1. This is done by hooking the upper run 96 of chain 97 under sprocket 90 and then up over sprocket 94. From sprocket 94, chain 97 goes back down around a sprocket 98 on the shaft 43 of motor 22.

Figure 7:
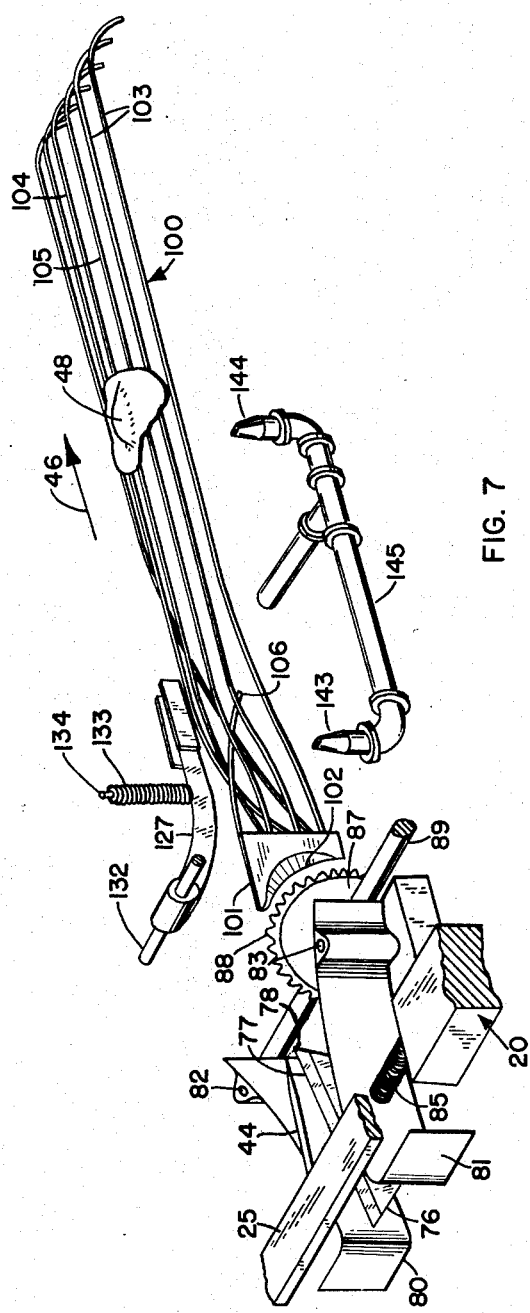
Figure 7 is an isometric view of a portion of the machine illustrating the cutting and flushing structure.

Immediately to the rear of knife 87 is the grid, generally 100, on which the gizzards are spread out for washing. A thin nose piece 101 at the front end of grid 100 has the leading edge 102 curved generally to conform to the configuration of blade 87. As is best seen in Figure 1, the plurality of longitudinal wires 103 that form grid 100, are at about the same elevation as are the pales 44. This is permitted by reason of the spacing between the two inner wires, 104 and 105, of grid 100, which allows the pale to move therebetween. To provide a transition between the nose piece 101, which is lower than the pales, and the wires 103 there is a single wire 106 that extends from the nose piece rearwardly and downwardly into the opening between wires 104 and 105. As is seen in Figure 1 and Figure 7, the grid 100 gradually flattens out towards the rearward end thereof to facilitate the thorough washing of the gizzard.

As the gizzards pass to the end of the run across which the processing takes place, they normally fall from the pales 44 down onto a chute 107, forming a part of the shield, generally 108. In some instances there may be a tendency of the gizzards not to fall from the pales and to insure that they are removed, a pair of spaced arms, 110 and 111, are used to flick the gizzards from the pales.

Figure 2:
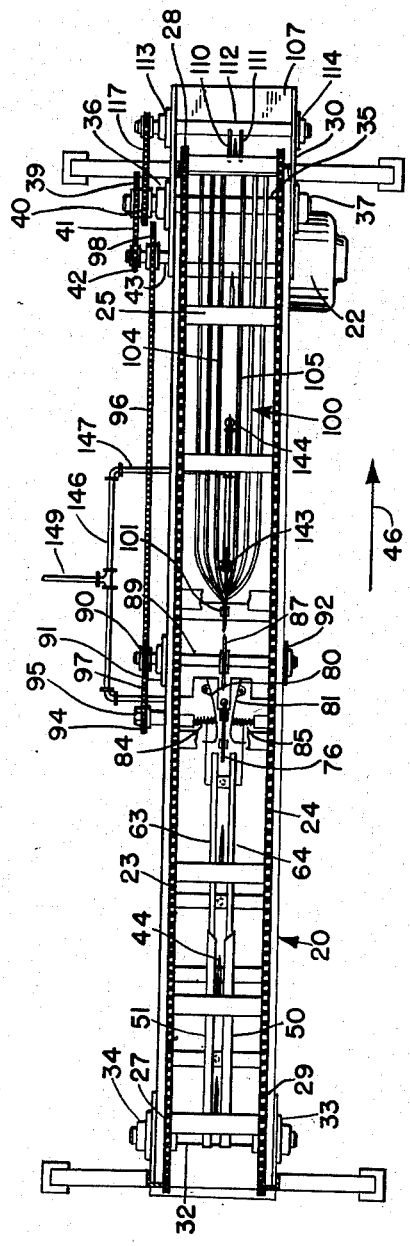
Figure 2 is a plan view of the embodiment with the portions thereof above the conveyor removed to illustrate the structure therebelow.

Arms 110 and 111 are secured to a shaft 112 journaled in bearings 113 and 114 attached to frame 20. As is seen in Figure 2 the arms are positioned on shaft 112 so as to be to either side of the line of movement of the pales 44. Sprocket 116 is connected to sprocket 40 on shaft 35 by means of a chain 117. Chain 117 also passes over a pair of idler sprockets 118 and 119 which are journaled on stub shafts 120 and 121, respectively, projecting outwardly from frame 20.

The idler sprockets are used so that the chain will loop around sprocket 116 in a direction to obtain a counterclockwise rotation of that sprocket, as viewed in Figure 1. The sizes of sprockets 40 and 116 are so proportioned that arms 110 and 111 will flick to either side of each of pales 44 as they pass adjacent shaft 112. Since at this time the arms 110 and 111 are moving downwardly, the arms will provide a positive dislodgement of the gizzards from the pales.

Figure 8:
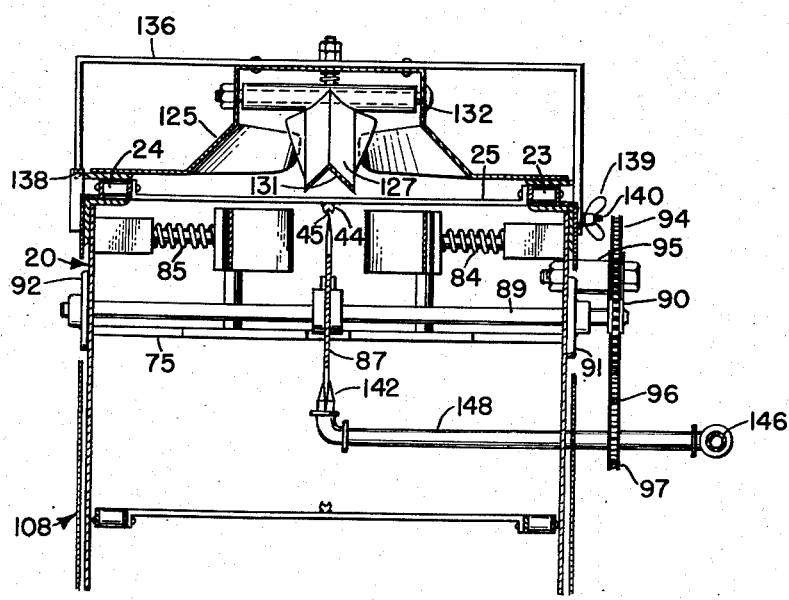
Figure 8 is an enlarged partial section taken at line 8—8 of Figure 1.

To facilitate the cutting and washing operations, pressure means are used to hold the gizzards in place while they are cut, and to flatten them out while they are washed. These pressure means are mounted within a hood 125 and comprise a plurality of pressure shoes 126 through 129. As is seen in Figure 8, with respect to pressure shoe 127, each of the shoes is formed with a tunnel 131 on the underside thereof. Each of the pressure shoes curves upwardly at the entering end thereof with the entering end being pivotally attached to the hood 125 by means of a bolt 132.

Adjacent the other end of the pressure shoe is a spring 133 which bears against shoe 127 and hood 125 to urge the shoe downwardly. Spring 133 is about a bolt 134 which limits the downward movement of shoe 127, while allowing the shoe to tip upwardly against the pressure of the spring. The structure and mounting of the remaining shoes 126, 128, and 129, is the same as that described with respect to shoe 127.

Hood 125 is mounted on a pair of brackets 136 and 137. One end of bracket 136 (Figure 8) is pivotally connected to frame 20 by means of a pin 138, while the other end of bracket 136 is held in place by means of a wing nut 139 on a bolt 140 secured to frame 20.

A spray head 142 is centered under the path of travel of the gizzards below the rear of corner 78 of knife 76. As previously mentioned in the description of the method of cutting of the present invention, this spray head 142 provides a jet of water directed into the cut made by the first knife 76, to dislodge a portion of the contents of the gizzard to decrease the dulling of the blade by which the final, deep, cut is made.

A pair of spray heads, 143 and 144 are positioned under grid 100 also in alignment with the path of travel of the gizzards after they have been opened and spread apart. Spray heads 143 and 144 are connected together through a pipe 145, which in turn is connected to a header 146 through a pipe 147. Spray head 142 is also connected to header 146 by means of a pipe 148. Pipe 149 connects header 146 to a suitable source of wash water supply.

The bottom of the central portion of shield 108 forms a sump 151 from which the water is drained off through a pipe 152 connected to a suitable drain.

The operator takes the gizzards one at a time and puts them in either the guide formed by strips 50 and 51 or the guide formed by strips 63 and 64, depending upon the size of the gizzard. Preferably the pale is inserted into the gizzard immediately adjacent one of the inner walls of the gizzard. The posterior opening left in the gizzard by the removal of the intestine provides a good guide for the proper insertion of the pale 44. By pushing the gizzard against the guides, the springs that support the guides may be depressed, thus allowing the operator to gauge the alignment of the gizzard with respect to the pale and provides a means of additionally compensating for gizzards of various sizes. As the pale moves forward into the gizzard it pierces the gizzard, whereupon the operator releases the gizzard to be carried forward by the pale.

If the operator does not hold the gizzard sufficiently long for the pale to completely pierce the gizzard, the contact of the gizzard with guides 80 and 81 will push the gizzard back on the pale and against spacer 25. When the pierced gizzard reaches knife 76, guides 80 and 81 hold the gizzard centered over the knife, while pressure shoe 126 holds the gizzard down against the knife. Knife 76 cuts part way into the inner opening of the gizzard, whereupon the jet of water from nozzle 142 flushes a portion of the contents from the interior of the gizzard. The gizzard is then carried across rotary knife 87, which extends upwardly into groove 45 of the pale 44 to complete the severing of the gizzard below the pale.

The unsevered portion of the gizzard lies above the pale 44 which provides some temporary support to the gizzard while it is moved across the nose 101 of grid 100. Thereafter the gizzard is principally supported upon the grid 100 and the interior thereof is washed by the jets of water from spray heads 143 and 144. Upon reaching the end of this run of the conveyor, the gizzards fall from the pales 44, or are flicked therefrom by arms 110 and 111 to drop down on chute 107 from which they may be received in a suitable receptacle, not shown.

In some embodiments there may be a tendency for the chains 23 and 24 and the crossbars 25 to move sideways or up and down as they travel across the top of the machine. This may result in an inaccurate cutting of the gizzards. To eliminate any tendency in this regard we bring flanges 154 and 155 into contact with the sides of the chain (see Figures 5 and 8) to prevent a sidewise movement. In addition an angle iron 156 is hooked over the top of the chain to prevent its moving up and down.

The foregoing description of the specific embodiment is for the purpose of complying with section 4888 of the Revised Statutes and is not to be construed as imposing unnecessary limitations upon the appended claims.

We claim:

1. A device for opening and cleaning internal animal organs, said device including a frame, conveyor means on said frame, said conveyor means having a generally horizontal run, piercing means attached to said conveyor means for movement thereby to pierce and engage an internal organ, said piercing means being of a size to pierce and engage an internal organ near the uppermost portion thereof when traversing said run, power means for said conveyor to move said piercing means in a predetermined direction, knife means attached to said frame and positioned along said run to intersect and sever a portion of said internal organ below said piercing means, a grid attached to said frame and positioned immediately beyond said knife means, with respect to the direction of movement of said conveyor, and a spray head below said grid and directed upwardly.

2. A device for opening and cleaning internal animal organs, said device including a frame, conveyor means on said frame, said conveyor means having a generally horizontal run, piercing means attached to said conveyor means for movement thereby to pierce and engage an internal organ, said piercing means being of a size to pierce and engage an internal organ near the uppermost portion thereof when traversing said run, power means for said conveyor to move said piercing means in a predetermined direction, knife means attached to said frame and positioned along said run to intersect and sever a portion of said internal organ below said piercing means, a grid attached to said frame and positioned immediately beyond said knife means, with respect to the direction of movement of said conveyor, pressure means attached to said frame and associated with said grid to contact the upper surface of said organ to flatten said organ against said grid, and a spray head below said grid and directed upwardly.

3. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, knife means attached to said frame and positioned along said run to intersect and sever said portion of said gizzard below said pale, a grid attached to said frame and positioned immediately beyond said knife means, with respect to the direction of movement of said conveyor, a pressure shoe movably attached to said frame and positioned immediately above said grid to contact the upper surface of the gizzards moved across said grid, said shoe having a concave lower surface, resilient means urging said shoe toward said grid, and a spray head below said grid and shoe and directed upwardly.

4. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, knife means attached to said frame and positioned along said run to intersect and sever said portion of said gizzard below said pale, said knife means comprising a plurality of knives so positioned with respect to the path of travel of said pale along said run as to cut increasingly deeper into said portion of said gizzard, a grid attached to said frame and positioned immediately beyond said knife means, with respect to the direction of movement of said conveyor, and a spray head below said grid and directed upwardly.

5. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, a pair of knives mounted on said frame and aligned with and below the path of movement of the pale traversing said run, the first of said knives, with respect to the direction of movement of the pale, being positioned a distance from said pale to sever only a fraction of said portion of said gizzard, the second knife being positioned sufficiently close to said pale to sever the remainder of said portion of said gizzard, a grid attached to said frame and positioned immediately beyond said pair of knives, with respect to the direction of movement of said conveyor, and a spray head below said grid and directed upwardly.

6. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, a pair of knives mounted on said frame and aligned with and below the path of movement of the pale traversing said run, the first of said knives, with respect to the direction of movement, being a single fixed blade, the second of the knives being a rotary knife having a scalloped edge, power means to rotate said second knife, the first of said knives, with respect to the direction of movement of the pale, being positioned a distance from said pale to sever only a fraction of said portion of said gizzard, the second knife being positioned sufficiently close to said pale to sever the remainder of said portion of said gizzard, a grid attached to said frame and positioned immediately beyond said pair of knives, with respect to the direction of movement of said conveyor, and a spray head below said grid and directed upwardly.

7. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, a pair of knives mounted on said frame and aligned with and below the path of movement of the pale traversing said run, the first of said knives, with respect to the direction of movement of the pale, being positioned a distance from said pale to sever only a fraction of said portion of said gizzard, the second knife being positioned sufficiently close to said pale to sever the remainder of said portion of said gizzard, pressure means attached to said frame and positioned immediately above said knives to contact the upper surface of said gizzard moved across said knives to hold said gizzard against said knives, a grid attached to said frame and positioned immediately beyond said pair of knives, with respect to the direction of movement of said conveyor, and a spray head below said grid and directed upwardly.

8. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, knife means attached to said frame and positioned along said run to intersect and sever said portion of said gizzard below said pale, said knife means including a single fixed blade positioned below and aligned with said pale traversing said run, the cutting edge of said blade, tapering upwardly in said direction of movement, a guide plate at each side of said blade, each of said plates being attached to said frame, resilient means urging a portion of each of said guide plates toward said blade, a grid attached to said frame and positioned immediately beyond said knife means, with respect to the direction of movement of said conveyor, and a spray head below said grid and directed upwardly.

9. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, knife means attached to said frame and positioned along said run to intersect and sever said portion of said gizzard below said pale, said knife means including a single fixed blade positioned below and aligned with said pale traversing said run, the cutting edge of said blade, tapering upwardly in said direction of movement, a guide plate at each side of said blade, each of said plates being attached to said frame, resilient means urging a portion of each of said guide plates toward said blade, a pressure shoe movably attached to said frame and positioned immediately above said knife means to contact the upper surface of said gizzard moved across said knife means, resilient means urging said shoe toward said knife means, a grid attached to said frame and positioned immediately beyond said knife means, with respect to the direction of movement of said conveyor, and a spray head below said grid and directed upwardly.

10. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, a pair of knives mounted on said frame and aligned with and below the path of movement of the pale traversing said run, the first of said knives, with respect to said direction of movement of the pale, being positioned a distance from the pale to sever substantially only a fraction of said portion of the gizzard on the pale, a spray head beyond the cutting portion of said first knife and directed upwardly against the severed part of the gizzard, the second knife being positioned sufficiently close to said pale to sever the remainder of said portion of said gizzard, a grid attached to said frame and positioned immediately beyond said knives, with respect to the direction of movement of said conveyor, and a spray head below said grid and directed upwardly.

11. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, a pair of knives mounted on said frame and aligned with and below the path of movement of the pale traversing said run, the first of said knives, with respect to the direction of movement, being a single fixed blade, the second of the knives being a rotary knife having a scalloped edge, power means to rotate said second knife, the cutting edge of said blade tapering upwardly in said direction of movement, a guide plate at each side of said blade, each of said plates being attached to said frame, resilient means urging a portion of each of said guide plates toward said blade, a pressure shoe movably attached to said frame and positioned immediately above said knives to contact the upper surface of said gizzard moved across said knives, resilient means urging said shoe toward said knives, said blade being positioned a distance from said pale to sever only a fraction of said portion of said gizzard, the rotary knife being positioned sufficiently close to said pale to sever the remainder of said portion of said gizzard, a grid attached to said frame and positioned immediately beyond said knives, with respect to the direction of movement of said conveyor, a pressure shoe movably attached to said frame and positioned immediately above said grid to contact the upper surface of the gizzard moved across said grid, resilient means urging said last mentioned shoe toward said grid, and a spray head below said grid and directed upwardly.

12. A device for opening and cleaning poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, a pair of guides resiliently mounted on said frame, said guides being positioned at each side of the path of travel of said pale along the initial portion of said run, the adjacent sides of said guides sloping downwardly and toward each other to form a pocket to support the gizzard, knife means attached to said frame and positioned along said run beyond said guides, with respect to said direction of movement, and below said path to intersect and sever said portion of said gizzard below said pale, a grid attached to said frame and positioned immediately beyond, with respect to the direction of movement of said conveyor, and a spray head below said grid and directed upwardly.

13. A device for opening poultry gizzards, said device including a frame, conveyor means on said frame, gizzard transporting means attached to said conveyor means for moving the gizzards along a given path with a portion of said gizzards extending outwardly to a side of said transporting means, power means for said conveyor to move said gizzards in a given direction, and a pair of knives mounted on said frame and aligned with said path to said side of said transporting means, the first of said knives, with respect to the direction of movement, being positioned a distance from said path to sever only a fraction of said portion of said gizzards, the second knife being positioned sufficiently close to said path to cut deeper into said portion.

14. A device for opening poultry gizzards, said device including a frame, conveyor means on said frame, gizzard transporting means attached to said conveyor means for moving the gizzards along a given path with a portion of said gizzards extending outwardly to a side of said transporting means, power means for said conveyor to move said gizzards in a given direction, a pair of knives mounted on said frame and aligned with said path to said side of said transporting means, the first of said knives, with respect to the direction of movement, being positioned a distance from said path to sever only a fraction of said portion of said gizzards, the second knife being positioned sufficiently close to said path to cut deeper into said portion, the first of said knives, with respect to the direction of movement, being a single fixed blade, the second of said knives being a rotary knife having a scalloped edge, and power means to rotate said second knife.

15. A device for opening poultry gizzards, said device including a frame, conveyor means on said frame, gizzard transporting means attached to said conveyor means for moving the gizzards along a given path with a portion of said gizzards extending outwardly to a side of said transporting means, power means for said conveyor to move said gizzards in a given direction, a pair of knives mounted on said frame and aligned with said path to said side of said transporting means, the first of said knives, with respect to the direction of movement, being positioned a distance from said path to sever only a fraction of said portion of said gizzards, the second knife being positioned sufficiently close to said path to cut deeper into said portion, pressure means attached to said frame and positioned to the other side of said gizzards at said knives to hold said gizzards against said knives, the first of said knives being a single fixed blade with the cutting edge thereof tapering toward said transporting means in said direction of movement, a guide plate at each side of said blade, each of said plates being attached to said frame, and resilient means urging a portion of said guide plates toward said blade.

16. A device for opening poultry gizzards, said device including a frame, conveyor means on said frame, gizzard transporting means attached to said conveyor means for moving the gizzards along a given path with a portion of said gizzards extending outwardly to a side of said transporting means, power means for said conveyor to move said gizzards in a given direction, and a pair of knives mounted on said frame and aligned with said path to said side of said transporting means, the first of said knives, with respect to the direction of movement being positioned a distance from said transporting means to sever substantially only a fraction of said portion, and a spray head mounted on said frame and directed along said first knife against the part of the gizzard severed thereby, the second knife being positioned to sever the remainder of said portion of the gizzard.

17. A device for opening poultry gizzards, said device including a frame, conveyor means on said frame, said conveyor means having a generally horizontal run, a pale attached to said conveyor means for movement thereby, said pale being positioned on said conveyor means so as to be generally horizontal when traversing said run, said pale being of a size to receive a gizzard thereabout with a substantial portion of said gizzard below said pale when traversing said run, power means for said conveyor to move said pale in a predetermined direction, a pair of knives mounted on said frame and aligned with and below the path of movement of the pale traversing said run, the first of said knives, with respect to the direction of movement, being a single fixed blade, the second of said knives being a rotary knife having a scalloped edge, power means to rotate said second knife, the cutting edge of said blade tapering upwardly in said direction of movement, a guide plate at each side of said blade, each of said plates being attached to said frame, resilient means urging a portion of each of said guide plates toward said blade, a pressure shoe movably attached to said frame and positioned immediately above said knives to contact the upper surface of said gizzard moved across said knives, and resilient means urging said shoe toward said knives, said blade being positioned a distance from said pale to sever only a fraction of said portion of said gizzard, said rotary knife being positioned sufficiently close to said pale to sever the remainder of said portion of said gizzard.

References Cited in the file of this patent

UNITED STATES PATENTS

| Number | Name | Date |
|---|---|---|
| 2,171,611 | Tolman et al. | Sept. 5, 1939 |
| 2,455,675 | Hawk | Dec. 7, 1948 |
| 2,613,391 | Still | Oct. 14, 1952 |
| 2,620,510 | Darrow et al. | Dec. 9, 1952 |
| 2,630,599 | Grant et al. | Mar. 10, 1953 |
| 2,663,899 | Biddinger et al. | Dec. 29, 1953 |